United States Patent [19]

Allan et al.

[11] 4,382,018

[45] May 3, 1983

[54] METHOD FOR MAKING TITANIUM TRICHLORIDE CATALYSTS

[75] Inventors: John L. H. Allan, Glen Rock; Birendra K. Patnaik, Parsippany; Agapios Agapiou, Dumont, all of N.J.

[73] Assignee: Dart Industries, Inc., Los Angeles, Calif.

[21] Appl. No.: 217,630

[22] Filed: Dec. 18, 1980

Related U.S. Application Data

[63] Continuation of Ser. No. 52,652, Jun. 27, 1979, abandoned.

[51] Int. Cl.³ .............................................. B01J 31/02
[52] U.S. Cl. ................................. 252/429 B; 252/429 C
[58] Field of Search .......................... 252/429 B, 429 C

[56] References Cited

U.S. PATENT DOCUMENTS

| | | | |
|---|---|---|---|
| 4,120,823 | 10/1978 | Mueller-Tamm et al. | 252/429 B X |
| 4,126,576 | 11/1978 | Inoue | 252/429 B |
| 4,222,894 | 9/1980 | Takahashi et al. | 252/429 |
| 4,246,135 | 1/1981 | Shiga et al. | 252/429 B |
| 4,246,136 | 1/1981 | Ueno et al. | 252/429 B |
| 4,251,388 | 2/1981 | Takahashi et al. | 252/429 B |
| 4,258,161 | 3/1981 | Kakogawa et al. | 252/429 B X |
| 4,259,466 | 3/1981 | Kortbeek et al. | 252/429 B X |
| 4,296,222 | 10/1981 | Staiger et al. | 252/429 B X |
| 4,316,975 | 2/1982 | Takahashi et al. | 526/142 |

*Primary Examiner*—Paul F. Shaver
*Attorney, Agent, or Firm*—Arnold, White & Durkee

[57] ABSTRACT

A storage stable, improved catalyst is obtained when an aluminum-reduced titanium trichloride catalyst which has been modified by treatment with an electron donor is heated at a temperature and for a period of time sufficient to drive the reaction to completion. In some instances this will involve the removal of gas which has been generated during the modification. In the usual practice a temperature of about 90° C. and a period of about 90 minutes will be employed.

10 Claims, No Drawings

METHOD FOR MAKING TITANIUM TRICHLORIDE CATALYSTS

This is a continuation of application, Ser. No. 52,652, filed June 27, 1979, now abandoned.

BACKGROUND OF THE INVENTION

The preparation of aluminum-reduced titanium trichloride catalysts is well known, and such catalysts are widely employed in the production of polyolefins, such as polyethylene and polypropylene. The preparation of such catalysts and their use in polymerization reactions is discussed in a number of patents, for example, in U.S. Pat. Nos. 3,121,063, 3,475,394, 4,154,702, 3,642,746 and 3,647,772, and in British Pat. No. 1,310,547.

It is also known that the performance of such catalysts can be improved by treatment with electron donor substances. Details of such treatment and examples of electron donors which have been employed are disclosed in, among others, U.S. Pat. Nos. 3,186,977, 4,110,248, 4,111,836, 4,115,319, 4,126,576, 4,127,504, 4,127,505, 4,142,991, and British Pat. No. 1,310,547.

However, the treatment of aluminum-reduced titanium trichloride catalysts with electron donors containing an OR radical, illustratively with various ethers, may result in the generation of by-products which adversely affect the catalysts. For example, they can generate undesirable pressures in the shipping container. In other instances the by-products which are formed may be toxic. This introduces an element of hazard which it is clearly desirable to avoid.

SUMMARY OF THE INVENTION

In accordance with the present invention it has been found that the presence of the undesirable and potentially hazardous by products can be eliminated by heat treating the modified aluminum-reduced titanium trichloride catalyst, and thereafter removing such substances by volatilization or extraction with a suitable solvent. This heat treatment is most advantageously effected after modification of the catalyst by the particular selected electron donor has taken place but can also be effected while the modification or activation treatment is being carried out.

Broadly, the modified catalyst is placed in a suitable vessel and the heat treatment is carried out at a temperature and for a time sufficient to drive the reaction to completion. In some instances this will involve removal of a gas formed in modification.

The temperature used in carrying out the heat treatment can be varied over the range of from about 40° to about 110°. The preferred range is from about 80° to about 100°, with a temperature of about 90° being the most advantageous.

The time of treatment can likewise be varied and will of course be related to the particular temperature at which the heat treatment is carried out. Thus, the time of treatment can be from about 10 minutes to about 300 minutes, with a preferred range of from about 60 to 120 minutes. In the usual practice of the present invention, the time will be about 80 minutes.

The heat treatment resulting in the elimination of the by products can be effected at above or below ambient pressure, illustratively from about 0.001 to about 2 atmospheres, but it is preferred to carry out the heat treatment at atmospheric pressure.

The heat treatment of the modified aluminum-reduced titanium trichloride catalyst in accordance with the present invention results in the production of a new and advantageous catalyst composition. When the base aluminum-reduced titanium trichloride is treated with a small quantity of an electron donor containing the group —OR and activated by milling at a temperature of about −10° C. to about 40° C., the following reaction will occur:

$$3TiCl_3, AlCl_3 + n\ ROR' \rightarrow (1-n),(3TiCl_3,AlCl_3)n(3TiCl_3,AlCl_3, ROR') \quad (I)$$

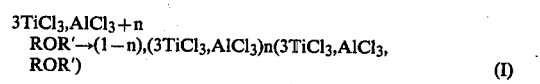

On heating the above product, the electron donor modified aluminum-reduced titanium trichloride, according to the procedure disclosed in the instant application, the following reaction takes place:

$$(1-n)(3TiCl_3,AlCl_3)n(3TiCl_3,AlCl_3,ROR') \rightarrow (1-n)(3TiCl_3,AlCl_3)n(3TiCl_3,AlCl_3,AlCl_2(OR')) + RCl \quad (II)$$

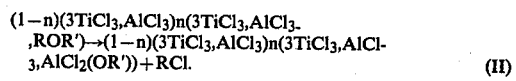

In the above equations, n is a positive number equal to, or less than, one.

The product obtained after completion of the above reaction is a new catalytic agent of a composition hitherto unknown. This catalyst has a high catalyst efficiency (CE) expressed as the weight of polymer produced in grams per gram of modified $TiCl_3$ catalyst used. The polymer which is produced using the new and improved catalyst of the present invention has improved isotacticity, that is, has a higher heptane insoluble (HI) content.

DESCRIPTION OF THE PREFERRED EMBODIMENT

As has been discussed under the heading SUMMARY OF THE INVENTION, the treatment of aluminum-reduced titanium trichloride catalysts to improve their effectiveness is known. Specific reference to patents teaching such treatment has already been made and the relevant disclosures of such patents is incorporated herein by reference.

The starting catalyst employed in the practice of the present invention can be aluminum-reduced, activated ($AA-TiCl_3$) or aluminum-reduced, unactivated ($A-TiCl_3$) titanium trichloride. Optionally, extra aluminum chloride, titanium tetrachloride, or titanium trichloride may be added.

The particular electron donor compounds which are employed as modifying agents in the activation of the catalysts with which the present invention is concerned are compounds of the following general formula:

$$R^1 - X - R^2$$

where X is O, S, Se or Te, and
wherein
 $R^1$ and $R^2$ are the same or are different, and are alkyl, cycloalkyl, aryl, or substituted derivatives thereof or a grouping of the formula:

wherein

X is O, S, Se or Te, and $R^3$ is alkyl, cycloalky, aryl, or substituted derivatives thereof.

The sole limitation on $R^1$ and $R^2$ is that the compounds $R^1Cl$ and/or $R^2Cl$, should be readily removable from the reaction product or their presence should be innocuous.

Examples of the modifier $R^1—X—R^2$ in the case where X is oxygen are organic oxygen-containing compounds such as the aliphatic ethers, aromatic ethers, aliphatic carboxylic acid esters and anhydrides, aromatic carboxylic acid esters and anhydrides, and unsaturated carboxylic acid esters and anhydrides. Specific examples of illustrative compounds are $(C_2H_5)_2O$; $C_6H_5—O—CH_3$; $C_6H_5CH_2—O—CH_3$; $CH_3CH(OC_2H_5)_2$; $(CH_3)_2C(OC_2H_5)_2$; $CH(OC_2H_5)_3$; $CH_3COOC_2H_5$; $C_6H_5COOC_2H_5$; $C_2H_5O—COOC_2H_5$; and $(CH_3CO)_2O$.

Special instances are compounds where $R^1$ and $R^2$ are part of a heterocyclic system as, for example, in tetrahydrofuran or ε-butyrolactone.

Hydrogen in the foregoing examples can be substituted by any one or more of the following groupings, for example, —Cl, —Br, —$CH_2Cl$, —$OC_2H_5$, —$CH_2OCH_3$, —$OCOCH_3$ and —$COCH_3$.

As earlier noted, there are certain art recognized problems associated with such modified catalysts. Among these problems are a lack of storage stability and a potential hazard arising from the generation of volatile or toxic substances. This is known to arise according to the following reaction:

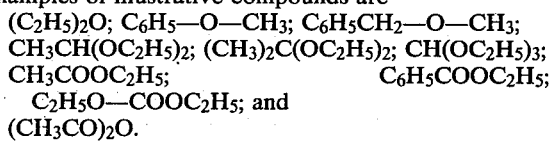

which has been discussed in the text "Friedel - Crafts and Related Reactions," Edited by George A. Olah; 1963, published by Interscience Publishers, New York, pages 572 and 585.

It has most surprisingly been found that the above problems can be overcome without loss of catalytic activity and efficiency by subjecting the electron donor modified aluminum-reduced titanium trichloride catalyst to a heat treatment at a temperature and for a period of time sufficient to effect the elimination of the RCl generated in accordance with reaction III.

The A- or the AA-$TiCl_3$ is mixed with the electron donor compound in an inert atmosphere and the mixture is heated to effect reaction. The heating according to the present invention can be done simultaneously with ball milling for activation or further activation of the catalyst, or the mixture can be heated after activation.

Gas products which are volatile can be removed by evaporation at elevated or at reduced pressure. Other products can also be removed by solvent extraction followed by filtration or can be left in the catalyst mixture if innocuous.

Other operations can be carried out after the heat treatment. For example, a low temperature milling or a grinding step may be run to adjust catalyst particle size. These subsequent steps could include the addition of further modifiers, especially to improve efficiency further and control particle size.

The following Examples which illustrate certain preferred embodiments of the present invention are intended only to illustrate the invention and are not to be construed in any limiting sense.

EXAMPLE I 7.6 kg of crystalline titanium trichloride compound of the approximate formula $TiCl_3.0.33\ AlCl_3$ (AA-$TiCl_3$ manufactured by Purechem Co.) are put in a vibratory ball mill having a 40 liter inner volume and containing 144 kg of steel balls of 1 inch diameter, under a nitrogen atmosphere. Anisole, in an amount of 12% wt. based on the amount of $TiCl_3.0.33\ AlCl_3$ is dispersed onto the catalyst over a period of 1 hour, while the mixture is being milled at 10° C. for 4 hours at a speed of 1500 rpm.

A sample of the catalyst was tested in the liquid propylene polymerization test as follows:

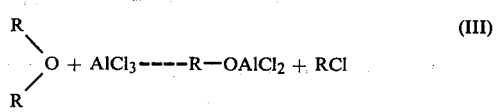

0.052 g of the modified $TiCl_3$ catalyst and 1.2 ml of a 0.66 M DEAC solution in n-heptane (DEAC/Ti (moles)=3.0) are charged into a 1 liter stainless steel autoclave equipped with an agitator. 0.027 moles of $H_2$ is then charged followed by the addition of 250 g of liquid propylene. The polymerization is carried out at 75° C. for 2 hours after which the unreacted propylene is vented off. The polymer thus obtained weighs 133 g and the catalyst productivity is 2557 g PP/g Cat.

A fraction of the polymer is extracted with boiling n-heptane for 16 hours in a Soxhlet Extractor and the n-heptane insoluble fraction is dried. The weight percent of the n-heptane insoluble polymer is 93.5.

EXAMPLE II

An anisole modified titanium trichloride is prepared using the same conditions and quantities recited in EXAMPLE I, except that the milling is carried out at 40° C. A sample of the co-pulverized mixture thus prepared, tested under the same polymerization conditions as in EXAMPLE I, gave a productivity of 2700 g PP/g Cat and an II of 95.6%.

EXAMPLE III

An anisole modified titanium trichloride is prepared using the same conditions and quantities recited in EXAMPLE I, except that the amount of anisole used was 9% wt. based on the amount of $TiCl_30.33\ AlCl_3$. A sample of the co-pulverized mixture thus prepared, when tested under the same polymerization conditions as described in EXAMPLE I, gave a productivity of 2500 g PP/g Cat and an II of 93.3%.

EXAMPLE IV

A sample of the anisole modified titanium trichloride prepared using the same conditions and quantities recited in EXAMPLE II was extracted with n-hexane using 10 ml of n-hexane per gram of catalyst and then dried under nitrogen. A sample of the thus treated catalyst was tested under the same polymerization conditions as in EXAMPLE I. The following results were obtained:

| CATALYST EFFICIENCY | | |
|---|---|---|
| | g PP/g Cat | II % |
| Before solvent extraction | 2692 | 95.7 |
| After solvent extraction | 2846 | 96.0 |

EXAMPLE V

HEAT TREATMENT OF THE MODIFIED CATALYST 100 g of an anisole modified titanium trichloride catalyst prepared as described in EXAMPLE II was placed in a sealed glass tube and treated at 85° C. and the gas evolved was monitored. Gas evolution was completed after 4 hours of heating. A sample of the heat treated catalyst was tested under the same polymerization conditions as in EXAMPLE I. The results obtained were as follows:

| | CATALYST EFFICIENCY | |
|---|---|---|
| | g PP/g Cat | II % |
| Before heating | 2385 | 95.5 |
| After heating | 2385 | 95.2 |

Samples of the modified catalyst were similarly heat treated at 90° C. and 110° C. At these temperatures, the gas evolution was completed after 3 hours and 0.5 hours respectively.

We claim:

1. A catalyst comprising $(1-n)(3TiCl_3AlCl_3)n(3TiCl_3-AlCl_2)$ where
   (a) n is a positive number less than or equal to one,
   (b) X is selected from the group consisting of oxygen, sulfur, selenium and tellurium,
   (c) XR is derived from an electron donor compound $R^1-X-R^2$ wherein $R^1$ is an organic grouping selected from the group consisting of alkyl, cycloalkyl, aryl, substituted derivations thereof and a grouping of the formula

wherein
   X is oxygen, sulfur, selenium or tellurium and $R^3$ is alkyl, cycloalkyl, aryl or substituted derivatives thereof, wherein $R^2$ is an organic grouping selected from the group consisting of alkyl, cycloalkyl, aryl, and substituted derivatives thereof, and wherein R is $R^1$ or $R^2$, and
wherein said catalyst is essentially free of any hydrocarbon solvent.

2. A catalyst according to claim 1 where R is a member selected from the group consisting of aryl, substituted derivatives thereof and a grouping of the formula:

wherein X is O, S, Se, or Te and $R^3$ is aryl or substituted derivatives thereof.

3. A catalyst according to claim 1 where R is phenyl.

4. A process for providing a storage stable olefin polymerization catalyst which comprises heating an aluminum-reduced titanium trichloride catalyst which has been activated by treatment with an electron donor compound of the formula $R^1-X-R^2$ wherein X is oxygen, sulfur, selenium or tellurium, wherein $R^1$ is alkyl, cycloalkyl, aryl, substituted derivatives thereof or a grouping of the formula:

wherein X is oxygen, sulfur, selenium or tellurium and $R^3$ is alkyl, cycloalkyl, aryl, or substituted derivatives thereof, and wherein $R^2$ is alkyl, cycloalkyl, aryl or substituted derivatives thereof, said heating being at a temperature and for a period of time sufficient to effect the elimination of substantially all of the $R^1Cl$ from said catalyst.

5. A process according to claim 4 wherein the electron donor compound is an organic ether or ester.

6. A process according to claim 5 wherein the electron donor is a compound of the formula $R^1-O-R^2$ wherein $R^1$ and $R^2$ are the same or different, and are alkyl, cycloalkyl, aryl, or substituted derivatives thereof or a grouping of the formula

wherein X is S, Se or Te, and $R^3$ is alkyl, cycloalkyl, aryl, or substituted derivatives thereof.

7. A process according to claim 6 wherein the electron donor compound is anisole.

8. A process according to claim 4 wherein the temperature is from about 40° to about 110° C. and the period of heating is from about 10 minutes to about 12 hours.

9. A process according to claim 8 wherein the temperature is from about 80° to about 100° C. and the period of heating is from about 20 minutes to about 3 hours.

10. A process according to claim 9 wherein the temperature is 90° and the period of heating is two hours.

* * * * *

UNITED STATES PATENT AND TRADEMARK OFFICE
CERTIFICATE OF CORRECTION

PATENT NO. : 4,382,018
DATED : May 3, 1983
INVENTOR(S) : John L. H. Allan et al.

It is certified that error appears in the above-identified patent and that said Letters Patent is hereby corrected as shown below:

Col. 5, line 26, "1. A catalyst comprising (1-n)(3TiCl$_3$AlCl$_3$)n(-" should read --1. A catalyst comprising (1-n) (3 TiCl$_3$AlCl$_3$)n--
Col. 5, line 27, "3TiCl$_3$-AlCl$_2$) where" should read --(3 TiCl$_3$-AlCl$_2$) (XR)) where --.

Signed and Sealed this

Tenth Day of July 1984

[SEAL]

Attest:

GERALD J. MOSSINGHOFF

Attesting Officer

Commissioner of Patents and Trademarks